US012769496B2

(12) United States Patent
Li et al.

(10) Patent No.: US 12,769,496 B2
(45) Date of Patent: *Oct. 20, 2026

(54) IMAGE DISPLAY METHOD AND APPARATUS, DEVICE, AND STORAGE MEDIUM

(71) Applicant: Beijing Zitiao Network Technology Co., Ltd., Beijing (CN)

(72) Inventors: He Li, Beijing (CN); Xiaoyi Qiu, Beijing (CN); Yijun Liu, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/207,331

(22) Filed: May 13, 2025

(65) Prior Publication Data

US 2025/0328302 A1 Oct. 23, 2025

Related U.S. Application Data

(63) Continuation of application No. 18/569,678, filed as application No. PCT/CN2022/095867 on May 30, 2022, now Pat. No. 12,321,654.

(30) Foreign Application Priority Data

Jun. 17, 2021 (CN) ........................ 202110673990.5

(51) Int. Cl.

| | |
|---|---|
| ***G06F 3/14*** | (2006.01) |
| ***G06F 3/0481*** | (2022.01) |
| ***G06F 3/04845*** | (2022.01) |
| ***G06F 3/04847*** | (2022.01) |
| ***G06F 3/0488*** | (2022.01) |
| ***G06T 5/50*** | (2006.01) |
| ***G06V 40/16*** | (2022.01) |

(52) U.S. Cl.

CPC .............. *G06F 3/14* (2013.01); *G06F 3/0481* (2013.01); *G06F 3/04845* (2013.01); *G06F 3/04847* (2013.01); *G06F 3/0488* (2013.01); *G06T 5/50* (2013.01); *G06V 40/171* (2022.01); *G06T 2207/20221* (2013.01)

(58) Field of Classification Search

CPC ............... G06F 3/0481; G06F 3/04845; G06F 3/04847; G06F 3/0488

See application file for complete search history.

(56) References Cited

U.S. PATENT DOCUMENTS

| | | | | |
|---|---|---|---|---|
| 2010/0218140 A1* | 8/2010 | Feke | .................... | A61B 6/5247<br>345/592 |
| 2018/0174549 A1* | 6/2018 | Whang | ............ | H04N 21/41265 |
| 2019/0122637 A1* | 4/2019 | Sanders | .............. | G06F 3/04842 |
| 2023/0073128 A1* | 3/2023 | Chen | ...................... | G06F 3/0482 |
| 2024/0220088 A1* | 7/2024 | Hu | ......................... | G06F 3/0481 |
| 2024/0264720 A1* | 8/2024 | Dong | .................. | H04N 21/482 |

* cited by examiner

*Primary Examiner* — Van N Chow

(74) *Attorney, Agent, or Firm* — Fish & Richardson P.C.

(57) ABSTRACT

Disclosed in embodiments of the present disclosure are an image display method and apparatus, a device, and a storage medium. The method comprises: obtaining current page information corresponding to a target page; determining, according to the current page information, a target display mode corresponding to a target image comprised in the target page, a corresponding target image resource comprising a file having dynamically changed image content, and the target display mode being a dynamic display mode or a static display mode; and finally, displaying, according to the target display mode, a target image resource corresponding to a corresponding target image on the target page.

19 Claims, 6 Drawing Sheets

1.

I.

IMAGE DISPLAY METHOD AND APPARATUS, DEVICE, AND STORAGE MEDIUM

CROSS REFERENCE

This application is a continuation application of U.S. application Ser. No. 18/569,678, filed on Dec. 13, 2023, which claims priorities to PCT Application No. PCT/CN2022/095867, filed on May 30, 2022, and Chinese Application No. 202110673990.5, filed on Jun. 17, 2021. The disclosures of the aforementioned applications are hereby incorporated by reference in their entireties.

TECHNICAL FIELD

Embodiments of the present disclosure relates to the field of computer technology, for example, an image display method and apparatus, a device, and a storage medium.

BACKGROUND

With the rapid development of Internet technology, various applications are emerging in endlessly, and image display in the applications is becoming increasingly rich.

When an application is used by users, for a registered user, the user can be generally allowed to set a personalized image for his own account.

However, the display mode and display effect of the image set by the user at present are monotonous and tedious and need to be optimized.

SUMMARY

The embodiments of the present disclosure provide an image display method and apparatus, a storage medium, and a device.

In a first aspect, an embodiment of the present disclosure provides an image display method, comprising:

- obtaining current interface information corresponding to a target interface, the target interface comprising a target image, and the current interface information comprising at least one of interface attribute information, interface interaction information and interface display state information;
- determining, according to the current interface information, a target display mode corresponding to the target image, the target display mode being a dynamic display mode or a static display mode; and
- displaying, in the target display mode, a target image resource corresponding to the target image on the target interface, the target image resource being a file having dynamically changed image content.

In a second aspect, an embodiment of the present disclosure provides an image display apparatus, comprising:

- an interface information obtaining module configured to obtain current interface information corresponding to a target interface, the target interface comprising a target image, and the current interface information comprising at least one of interface attribute information, interface interaction information and interface display state information;
- a display mode determining module configured to determine, according to the current interface information, a target display mode corresponding to the target image, the target display mode being a dynamic display mode or a static display mode; and
- an image display module configured to display, in the target display mode, a target image resource corresponding to the target image on the target interface, the target image resource being a file having dynamically changed image content.

In a third aspect, an embodiment of the present disclosure provides a computer-readable storage medium having thereon stored a computer program which, when executed by a processor, implements the image display method according to the embodiment of the present disclosure.

In a fourth aspect, an embodiment of the present disclosure provides an electronic device, comprising a memory, a processor, and a computer program stored in the memory and running on the processor, the processor implementing, when executing the computer program, the image display method according to the embodiment of the present disclosure.

DETAILED DESCRIPTION

Figure 1:
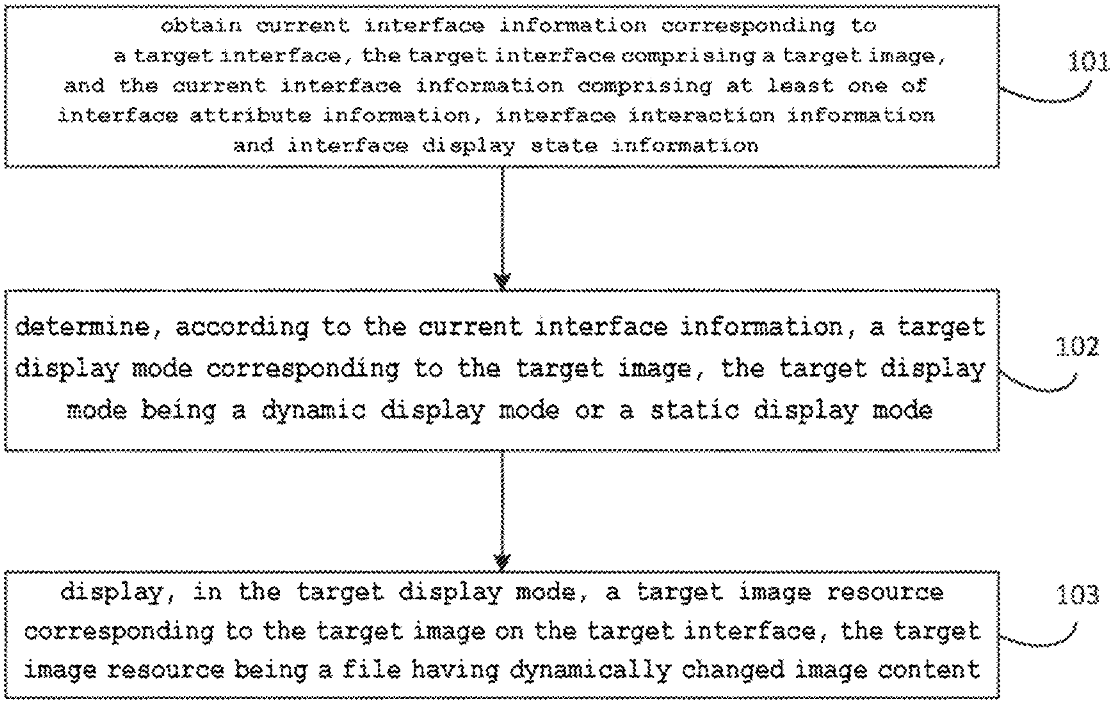
FIG. 1 is a schematic flow diagram of an image display method provided by an embodiment of the present disclosure.

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, which are provided for more complete and thorough understanding of the present disclosure instead. It should be understood that the drawings and the embodiments of the present disclosure are for exemplary purposes only and are not intended to limit the scope of protection of the present disclosure.

It should be understood that various steps recited in method embodiments of the present disclosure may be performed in a different order, and/or performed in parallel. Moreover, the method embodiments may include additional steps and/or omit performing the illustrated steps. The scope of the present disclosure is not limited in this respect.

The term "including" and variations thereof used herein are intended to be open-ended, i.e., "including but not limited to". The term "based on" is "at least partially based on". The term "one embodiment" means "at least one embodiment"; the term "another embodiment" means "at least one other embodiment"; and the term "some embodiments" means "at least some embodiments". Definitions related to other terms will be given in the following description.

It should be noted that the concepts "first", "second", and the like mentioned in the present disclosure are only used for distinguishing different devices, modules or units, and are not used for limiting the order or interdependence of functions performed by the devices, modules or units.

It should be noted that modifications of "a" or "a plurality" mentioned in this disclosure are intended to be illustrative rather than restrictive, and that those skilled in the art should appreciate that they should be understood as "one or more" unless otherwise explicitly stated in the context.

Names of messages or information exchanged between a plurality of devices in the embodiments of the present disclosure are for illustrative purposes only, and are not intended to limit the scope of the messages or information.

In a plurality of embodiments described below, example features are provided in each embodiment, and the features recited in the embodiments may be combined to form a plurality of example solutions, so that each numbered embodiment should not be considered as only one technical solution. The embodiments of the present disclosure provide an image display method and apparatus, a storage medium, and a device, capable of improving image display solutions in the related art.

FIG. 1 is a flow diagram of an image display method provided by an embodiment of the present disclosure, the method being executable by an image display apparatus, where the apparatus may be implemented by software and/or hardware and may be generally integrated in an electronic device. The electronic device can be a mobile device such as a mobile phone, an intelligent watch, a tablet and a personal digital assistant; or another device such as a desktop computer. As shown in FIG. 1, the method comprises:

Step 101, obtaining current interface information corresponding to a target interface, the target interface comprising a target image, and the current interface information comprising at least one of interface attribute information, interface interaction information and interface display state information.

The interface in the embodiment of the present disclosure may be an interface in a preset application, and a type or the like of the preset application is not specifically limited, and may be a social application with a social function, such as a short video application, an instant messaging application, or a live-streaming application, and may also be another type of application. The target interface may include an interface to be displayed soon or being displayed currently in the preset application. For example, a user may log in to the preset application by an account.

In the embodiment of the present disclosure, the target interface comprises a target image, and target image may, exemplarily, include an avatar or a background image, or include both the avatar and the background image, or include an image in another form. A shape, size, position, etc. of a display area of the avatar and/or the background image in the target interface are not limited and can be set according to an actual layout requirement of the target interface. Exemplarily, the avatar, which generally corresponds to an account of a user, may serve as a kind of identity information of the user, and the display shape, which may be, for example, a circle or a rectangle, may be displayed near an account name; and the display area of the background image may occupy the entire target interface or a portion of the target interface. Exemplarily, the background image includes a web banner, which may be understood as a picture located at the top or in the center of a profile of the application interface or a browser webpage, and in this case, the target interface specifically may be a profile, for example, a personal profile of the user.

Figure 2:
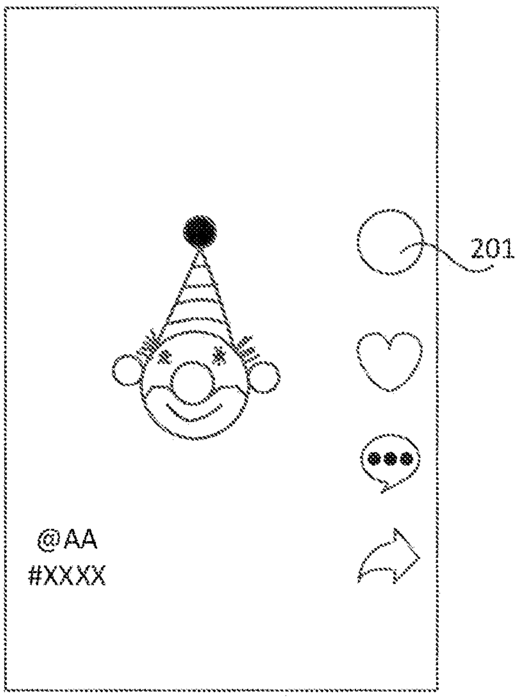
FIG. 2 is a schematic diagram of a target interface provided by an embodiment of the present disclosure.
Figure 3:
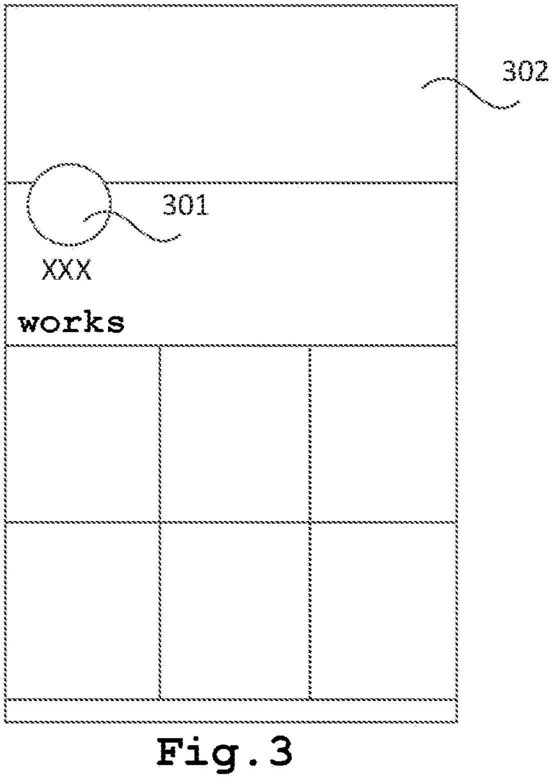
FIG. 3 is a schematic diagram of another target interface provided by an embodiment of the present disclosure.

Exemplarily, a short video application is taken as an example for illustration. FIG. 2 is a schematic diagram of a target interface provided by an embodiment of the present disclosure, where the target interface shown in FIG. 2 may be a video play interface in a short video application, and a target image displayed in the interface includes an avatar 201. FIG. 3 is a schematic diagram of another target interface provided by an embodiment of the present disclosure, where the target interface shown in FIG. 3 may be a personal profile in a short video application, and a target image displayed in the interface includes an avatar 301 and a web banner 302.

In the embodiment of the present disclosure, the interface information may include interface attribute information, interface interaction information, interface display state information, or the like, may also include a plurality of the above information simultaneously, and may also include other information, which is not specifically limited. Exemplarily, the current interface information includes at least one of interface attribute information, interface interaction information and interface display state information corresponding to the target interface. The interface attribute information may include information such as an interface type, and a specific type division mode of the interface type is not limited and may be set according to an actual requirement of the preset application, and may include, by taking a short video application as an example, a user personal profile, a video play interface, a video list interface, and various other types of interaction interfaces. A specific state division mode of the interface display state is not limited and may be set according to an actual requirement of the preset application, and by taking a user personal profile in a short video application as an example, may include a host state (which may be understood that a user currently browsing the interface is the same as a user of the personal profile) and a guest state (which may be understood that a user currently browsing the interface is different from a user of the personal profile), and when a video list is included in the user personal profile, may further include a video static state and a video preview state, etc.; and the interface display state may further include a display triggering mode of the target interface, which can, by taking a video play interface in a short video application as an example, be triggering display of a video play interface in a video recommendation mode, or triggering display of a video play interface according to a selection operation of the user from a video play list. The interface interaction information may include, for example, an operation object, an operation type, an operation sequence, an operation duration and other related interaction operation information corresponding to an interaction operation inputted by a current user in the target interface, wherein the operation object may include the target image or other content in the target interface, which is not specifically limited.

In addition, for the case where the target interface is currently in a display state, the target image might also be in the display state, and the current interface information may further include information related to the target image, such as a current display state (which may include displayed or not displayed, etc.) of the target image or a current display mode of the target image.

Step 102, determining, according to the current interface information, a target display mode corresponding to the target image, the target display mode being a dynamic display mode or a static display mode.

Exemplarily, the dynamic display mode includes dynamic play of an image, i.e., continuous display of at least two images with different content, which for a target image, may be understood as dynamic play of image frames in a target image resource corresponding to the target image; the static display mode includes static display of an image, i.e., fixed display of one image with continuously unchanged picture content, which for a target image, may be understood as static display of a certain image frame in a target image resource corresponding to the target image. There can be one or more dynamic display modes, and there can also be one or more static display modes, so that display modes corresponding to different interface information can be preset, and then a target display mode corresponding to the target image is determined according to the current interface information.

For example, a plurality of candidate display modes corresponding to the avatar and/or the background image may be preset, wherein the candidate display mode may include one or more dynamic display modes or one or more static display modes. Exemplarily, correspondence between different interface information and different candidate display modes may be preset, so that a target display mode corresponding to the target image may be determined according to the current interface information based on the correspondence. It should be noted that, for the avatar and the background image, the above correspondence may be different or the same, and may be set according to an actual requirement. That is, when the target interface includes both the avatar and the background image, a target display mode corresponding to the avatar and a target display mode corresponding to the background image may be different or the same.

Step 103, displaying, in the target display mode, a target image resource corresponding to the target image on the target interface, the target image resource being a file having dynamically changed image content.

Exemplarily, when display of an image is performed in a interface, the display is generally performed according to a corresponding image resource. In the related art, the display effect and visual effect of the avatar and the background image are monotonous and tedious, and lack interactivity. However, in the embodiment of the present disclosure, the target image resource corresponding to the target image is a file having dynamically changed image content, which can be, for example, a file in a video format, or a file in a dynamic picture format, such as a graphics interchange format (GIF), which is not specifically limited. A storage location of the target image resource is not limited and may be the electronic device locally, a server corresponding to the preset application, or the like. In the case where the target image needs to be displayed, the display of the target image needs to be refreshed, or the like, all or part of data in the target image resource corresponding to the target image can be obtained for corresponding display. Exemplarily, the target image resource may include a plurality of image frames arranged according to a play sequence, and the above all or part of the data may include data corresponding to all or part of the image frames.

Exemplarily, after the target display mode corresponding to the target image is determined, all or part of data of a corresponding target image resource may be obtained, to display all or part of images corresponding to the target image resource according to the target display mode corresponding to the target image. For example, the target image includes an avatar and a background image, the target display mode corresponding to the avatar being a dynamic display mode, and the target display mode corresponding to the background image being a static display mode, then it is possible to obtain data corresponding to at least two images in a target image resource corresponding to the avatar and perform dynamic play of the at least two images, and obtain data corresponding to one image in the target image resource corresponding to the background image and perform static display of the image.

According to the image display solution provided by the embodiment of the present disclosure, current interface information corresponding to the target interface is obtained, the target display mode corresponding to the target image comprised in the target interface is determined according to the current interface information, the target image comprising an avatar and/or a background image, the corresponding target image resource comprising a file having dynamically changed image content, and the target display mode being a dynamic display mode or a static display mode, and finally, the target image resource corresponding to the corresponding target image is, according to the target display mode, displayed on the target interface. By adopting the above technical solution, the image resource of the target image in the interface can be set as the file having dynamically changed image content, and when the target image needs to be displayed in the interface, a display mode corresponding to the image resource is selected according to actual interface information, so that the target image can be displayed in different modes under different conditions, which enriches the mode of feedback of the interaction operation of the user, and improves the interaction experience.

For example, when the target image includes an avatar and/or a web banner, the image resource of the avatar or background image in the interface may be set as a file having dynamically changed image content, and when the avatar or background image needs to be displayed in the interface, a display mode corresponding to the image resource is selected according to actual interface information, so that the avatar or background image may be displayed in different modes under different conditions, which enriches the display effect and visual effect of the avatar or background image, makes the display more personalized, and increases interest.

In some embodiments, when the target display mode is a dynamic display mode, the displaying, in the target display mode, a target image resource corresponding to the target image on the target interface comprises: performing continuous and dynamic play of image frames in a target image resource corresponding to the corresponding target image on the target interface; or after the times of play of the target image resource corresponding to the corresponding target image in the target interface reach a preset number of loops, stopping the play and displaying a single-frame image with a first preset frame number in the target image resource, one loop comprising continuous and dynamic play from a first frame in the target image resource to a last frame. This can provide multiple dynamic display modes and further enrich the dynamic play effect.

Exemplarily, the performing continuous and dynamic play on image frames in a target image resource corresponding to the corresponding target image on the target interface may be understood as, after it is determined that the target display mode corresponding to the target image is the dynamic display mode, starting sequential play of the image frames from a preset image frame in the corresponding target image resource until a preset play stop condition is satisfied, such as a user inputting a stopping-play instruction or exiting the target interface, the preset image frame being generally a first frame, namely, a frame with a frame number of 1. For such a dynamic display mode, the number of image frames played back may be less than or equal to a total number of the image frames in the target image resource, and the number of times of play of each image frame may be greater than or equal to 0. For example, a total number of image frames in a target image resource is 10, and image frame 1 (a first frame), image frame 2, image frame 3, and so on can be played back sequentially; and if a user inputs a stopping-play instruction when the play proceeds to image frame 5, the play is stopped, and if a preset play stop condition is not satisfied after the play proceeds to image frame 10, the image frame 1 can be played back again.

Exemplarily, after the times of play of a target image resource corresponding to the corresponding target image in the target interface reach a preset number of loops, the play is stopped and a single-frame image with a first preset frame number in the target image resource is displayed, so that it is possible to automatically control the number of loops of the play and avoid continuous dynamic play from affecting the user viewing other content in the target interface. The preset number can be set according to an actual requirement, such as 1 or 2. The first preset frame number can, according to actual requirements, be set to, for example, 1, that is, static display of a first frame image after the loop play is completed. Of course, the first preset frame number may also be another number, such as a number of a last frame or a number of an intermediate frame.

In some embodiments, when the target display mode is a static display mode, the displaying, in the target display mode, a target image resource corresponding to the target image on the target interface comprises: performing static display of a single-frame image with a second preset frame number in a target image resource corresponding to the corresponding target image on the target interface. The second preset frame number may, according to an actual requirement, be set to, for example, 1, that is, when it is determined that the target display mode is the static display mode, performing static display of the first frame image. Of course, the second preset frame number may also be another number, such as a number of a last frame or a number of an intermediate frame.

In some embodiments, the interface attribute information comprises an interface type; and the determining, according to the current interface information, a target display mode corresponding to the target image comprises: determining, according to an interface type corresponding to the target interface, that the target display mode corresponding to the target image is a dynamic mode; or determining, according to the interface type corresponding to the target interface, that the target display mode corresponding to the target image is a static mode; or determining, according to the interface type corresponding to the target interface and preset information in the current interface information, that the target display mode corresponding to the target image is a dynamic mode or a static mode. The preset information may be other information in the current interface information, such as interface interaction information or interface display state information. For example, when the current interface information corresponds to a first interface type, a target display mode corresponding to the target image is a dynamic display mode; when the current interface information corresponds to a second interface type, a target display mode corresponding to the target image is a static display mode; and when the current interface information corresponds to a third interface type, a target display mode corresponding to the target image is determined according to other information in the current interface information. In this way, the display mode of the avatar and/or the background image in some interfaces can be quickly determined according to the interface type. That is to say, for some interfaces, the display mode of the avatar and/or the background image contained therein is fixed as a dynamic display mode; for some interfaces, the display mode of the avatar and/or the background image contained therein is fixed as a static display mode; for some interfaces, the display mode of the avatar and/or the background image contained therein can be dynamically determined according to other information in the interface information according to actual conditions.

For example, taking a short video application as an example, when the interface type is a preview interface (a first interface type) of the avatar or the background image, the display mode may be fixed as a dynamic display mode. When the interface type is a live-streaming interface (a second interface type), which generally includes an avatar, the display mode of the avatar can be fixed as a static display mode at this time, so that interference with live-streaming content is avoided. When the interface type is a personal profile (a third interface type), the display mode can be determined according to other information, such as an avatar type, when the avatar is added with a dynamic pendant, the display mode can be a static display mode, and when the avatar is not added with a dynamic pendant, the display mode can be a dynamic display mode; and for another example, when the interface type is a video play interface (a third interface type), the display mode may be determined according to an interface display state, for example, for triggering display of the video play interface in a video recommendation mode, the display mode may be a dynamic display mode, and for example, for triggering display of the video play interface according to a selection operation of a user from a video play list, the display mode may be a static display mode.

In some embodiments, the current interface information comprises the interface interaction information; and the determining, according to the current interface information, a target display mode corresponding to the target image comprises: in the case where the interface interaction information comprises a first preset operation, the target display mode corresponding to the target image being a dynamic display mode, the first preset operation comprising an interaction operation for first content in the target interface. In this way, it is possible to feed back the interaction operation of the user in the mode of dynamic play of the avatar, thereby making the interaction feedback more intuitive and novel, and further promoting the interest, so that the interaction experience can be effectively promoted while the application function is enriched.

In some embodiments, the current interface information comprises the interface interaction information; and the target image in the target interface corresponding to a first user. The determining, according to the current interface information, a target display mode corresponding to the target image comprises: in the case where the interface interaction information comprises a first preset operation inputted by a second user, a target display mode corresponding to the avatar being a dynamic display mode, the second user being different from the first user, and the first preset operation comprising an interaction operation for first content in the target interface that is released by the first user. In this way, it is possible to feed back the interaction operation between different users in the mode of dynamic play of the avatar, thereby making the interaction feedback mode between different users more intuitive and novel, and further promoting the interest, so that interaction experience can be effectively promoted while the application function is enriched.

For example, there may be a plurality of forms of first preset operations, for example, a plurality of forms of interaction operations, and different first preset operations may correspond to different dynamic display modes, which can further enrich interaction-based image display effects and improve the interaction experience.

For example, the displaying, in the target display mode, a target image resource corresponding to the target image on the target interface comprises: after the times of play of a target image resource corresponding to the avatar in the target interface reach a preset number of loops, stopping the play and displaying a single-frame image with a third preset frame number, one loop comprising continuous and dynamic play from a first frame in the target image resource to a last frame. For example, the preset number is 1.

Exemplarily, the target interface may be used for presenting the first content released by the first user, wherein the first content may be referred to as work content, and may be information, files or the like in various forms, such as image, text, audio, or video, which is not specifically limited. The second user may, when viewing the first content, generate many forms of interaction operations, which may be directly implemented on the electronic device by the user, such as touching a screen by a finger. Exemplarily, the interaction operation may be inputted by an interaction control, which may be, for example, a forward interaction control, such as a like control, a follow control, and a comment control. After the second user inputs the interaction operation, play of the image resource of the avatar can be looped once, and then the play stays at a single-frame image with a third preset frame number, wherein the third preset frame number can be freely set, such as a number of the first frame. For example, after viewing a short video released by a first user, a second user is very fond of the short video and can click a like control, and play of an avatar of the first user in an interface is looped once for making a response, so that the second user can quickly and intuitively feel the feedback of the first user.

In some embodiments, the current interface information comprises interface interaction information corresponding to the target interface; the determining, according to the current interface information, a target display mode corresponding to the target image comprises: when the interface interaction information comprises a second preset operation for the target image that is inputted by the user, the target display mode corresponding to the target image being a dynamic display mode, wherein the second preset operation comprises a sliding operation, a clicking operation or a long-pressing operation. In this way, the dynamic play of the background image can be conveniently realized. For example, the target image here may be a background image.

For example, different second preset operations may correspond to different dynamic display modes, which can further enrich interaction-based image display effects, and improve the interaction experience.

For example, the target image includes a background image; and the second preset operation includes a sliding operation, and the displaying, in the target display mode, a target image resource corresponding to the target image on the target interface comprises: performing dynamic play of image frames in a target image resource corresponding to the background image in the target interface, and dynamically adjusting a display size of the background image following a sliding trajectory of the second preset operation in the play process. For example, it can be: performing continuous dynamic play starting from an image frame with a fourth preset frame number in a target image resource corresponding to a background image in a target interface, and dynamically adjusting a display size of a background image following a sliding trajectory in the play process. For the background image, such as a web banner, which generally has a large image size, in order to avoid occupying too much interface display space, it can serve as an interface decoration and its display size is controlled before not operated by the user, and when the user performs an operation for the background image, the display size can be changed (e.g., enlarged) to display the image content in the background image more completely or clearly. The display size is adjusted in combination with the sliding trajectory in the dynamic play process, which can further improve the interest, facilitate viewing the dynamic background image, and enrich the application function.

Exemplarily, the second preset operation may be to press a screen (which may be a position where the background image is located or another position in the target interface) and slide, the display size of the background image may extend in a sliding direction, and if the sliding direction is changed to an opposite direction, the display size of the background image may retract in the sliding direction.

In some embodiments, the interface display state information comprises a current display mode of the target image, the target image in the target interface comprising both a first target image and a second target image, and the determining, according to the current interface information, a target display mode corresponding to the target image comprising: in the case where a current display mode of the first target image is a dynamic display mode and a current display mode of the second target image is a static display mode, detecting a third preset operation for the second target image, then determining that the target display mode corresponding to the first target image is a static display mode and the target display mode corresponding to the second target image is a dynamic display mode. For example, the first target image is an avatar or a background image. It can be understood that, the first target image is an avatar, and the second target image is a background image; or the first target image is a background image, and the second target image is an avatar. In this way, when the interface contains both the avatar and the background image, simultaneous play of the avatar and the background image can be avoided to prevent the play of the both from interfering with each other. The third preset operation may be an operation of triggering display of the second target image in a dynamic display mode, which is not limited.

In some embodiments, a character in the target image comprises a virtual character obtained after the image of the target object is processed. The target object may be a human being, such as a certain user, or an animal. In this way, the target image can be made more interesting. In addition, when the target object is a user, a real image of the user can be processed to obtain a virtual character, so that this can help the user viewing the target image to more quickly confirm an identity of a user to which the target image belongs. When the character in the target image is a virtual character obtained after the real image of the user is processed, the virtual character can generally retain some real features of the user, which can facilitate recognition by other users, and the virtual character at this time is more interesting, which is beneficial to improving the visual effect of the target image. The virtual character may include, for example, a cartoon character, a human figure, or the like, wherein the human figure may be a three-dimensional (3D) human figure. It should be noted that, in the embodiment of the present disclosure, the number of the characters included in the target image is not limited, that is, the target image may include characters corresponding to one or more target objects.

In some embodiments, a target image resource of a target image comprising the virtual character is obtained by: in response to an operation that the user triggers a shooting function, obtaining video data comprising a facial image of the target object; detecting facial key points in the video data; inputting the facial key points and the video data into a preset style migration model to obtain an initial image resource comprising the virtual character; and fusing original image information in the video data into the initial image resource to obtain the target image resource. The generated virtual character in the target image resource is more fit with the real features of the user, and some image information in the video data of the user is reserved, to more fit the setting requirement and the aesthetic requirement of the user for the target image. For example, the original image information comprises at least one of low-frequency information and illumination information. It should be noted that the target object includes a human being, an animal, and another object having a facial feature.

Exemplarily, the video data is acquired by an image acquisition means such as a camera in the electronic device in response to the operation that the user triggers the shooting function. It should be noted that, if the video data does not include the facial image of the target object, a prompt may be made, without entering a subsequent operation such as detecting the facial key points. If the facial image is obtained by the acquisition of the electronic device, real-time facial detection can be performed in the acquisition process, and when it is determined that a face is not included in a shot picture, a prompt is made, for example, prompting that the user adjusts a position of the electronic device or adjusts a position of his own head. The video data comprising the facial image of the target object is typically stored in the electronic device locally.

Exemplarily, the number and specific locations of the facial key points may be set according to actual conditions, which may include, for example, points on a minimum bounding box of a facial area, and may further include points on a canthus, a tip of a nose, or other five sense organs. The preset style migration model may be, for example, a generative adversarial network model, whose specific model structure and model parameters are not limited. For example, different preset style migration models are set for different virtual effects, options of the preset style migration models can be provided for the user in a mode of presenting samples, and a suitable preset style migration model is selected by the user according to his own preference. The low-frequency information may include, for example, skin color information and the like. After the initial image resource outputted by the model is obtained, the original image information can be migrated to the initial image resource and fused with same-level information of the image in the initial image resource to obtain the final target image resource.

Exemplarily, one frame of image in the video data is taken as an example for specific description. Facial key points in a video frame are detected, and a bounding box containing the facial key points is determined. The video frame, the bounding box and the facial key points at a preset position are inputted into a preset style migration model to obtain an initial image comprising a virtual character. The preset position can include a left eye position, a head position and a tail position of a right eyebrow, and a left position below a nose. The virtual character in the initial image has a target style feature corresponding to the preset style migration model and a content feature of the video frame, wherein the target style feature may be a style feature learned by the preset style migration model from images of a sample image set, such as a cartoon style feature. Original image information in the video frame is extracted, such as low-frequency information and illumination information, and the low-frequency information and the illumination information are fused with same-level information of the original image to obtain a target image. Finally, a final target image resource is generated according to the target images corresponding to the plurality of video frames in the video data. Because the frequency of the image is an index for representing intensity of gray-scale changes in the image, an area with slow gray-scale changes in the image corresponds to low-frequency information, a general appearance of a face in the video frame can be represented by the low-frequency information, while the illumination information can more realistically restore current shooting environment information, so that the virtual character in the target image is closer to a real target object. In addition, when a virtual character of a 3D human figure needs to be generated, the images in the sample image set can be optimized in a training process of the preset style migration model. For example, a sample image containing a three-dimensional face is generated based on a three-dimensional model and an original sample image in a sample image set, thereby enabling the preset style migration model to learn not only the style feature such as a cartoon style but also three-dimensional facial information in the training process, so that a virtual character containing a 3D human figure can be rapidly generated.

In some embodiments, the method may further comprise: displaying a shooting preview interface in an application to which the target interface belongs, and generating, according to corresponding video data in the shooting preview interface, a target image resource of the corresponding target image. In this way, the user can be allowed to conveniently complete the setting of the target image in the preset application in the mode of video shooting. Taking an avatar as an example, the user may, on an avatar setting interface, trigger a control for shooting a dynamic avatar, to enter a shooting preview interface in an application, and after a shooting button is triggered, an electronic device starts to acquire a video image for generating a corresponding target image resource.

Figure 4:
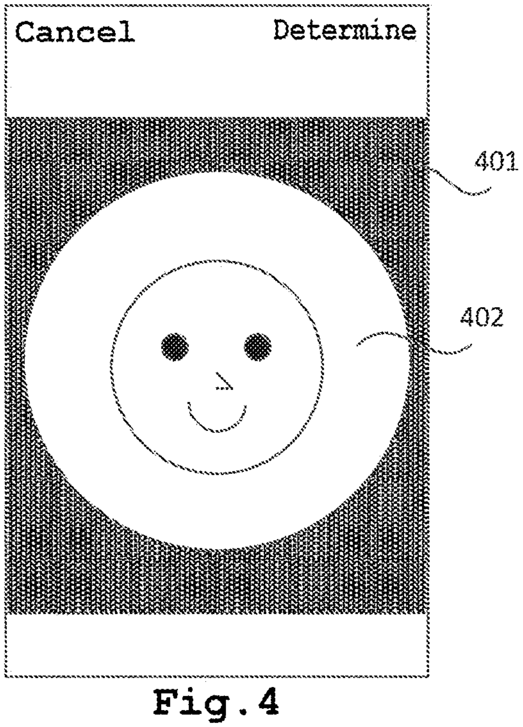
FIG. 4 is a schematic diagram of a shooting preview interface provided by an embodiment of the present disclosure.

For example, the shooting preview interface comprises a shooting prompt box, whose size ratio matched with that of the target image; and correspondingly, a target image resource of the corresponding target image is generated according to corresponding video data in the shooting prompt box. An image acquisition area corresponding to the target image to be generated soon is prompted to the user in the mode of displaying the shooting prompt box, so that the user can quickly and intuitively adjust a position of his own head, thereby reducing related operations of manually adjusting the area where the content of the target image is located by the user later, and improving the generation efficiency of the target image resource. For example, a shooting prompt box may be displayed in a form of a mask (such as a gray area), image content in an area covered by the mask does not enter a target image resource, while image content in an area not covered by the mask is image content in the target image resource. For example, for an avatar, the avatar is circular when displayed, and a non-mask area may be a circular area. FIG. 4 is a schematic diagram of a shooting preview interface provided by an embodiment of the present disclosure, and as shown in FIG. 4, a shooting prompt box 401 is displayed in a form of a mask, and a non-mask area 402 is circular; for a background image, a non-mask area may be a rectangular area, whose aspect ratio is consistent with an aspect ratio corresponding to an image in a target image resource. For example, a shooting prompt box may exist in a form of a prop, for example, when a shooting preview interface is displayed, a prop component corresponding to the shooting prompt box is invoked, and then the shooting prompt box is displayed in the shooting preview interface.

In some embodiments, the application to which the target interface belongs comprises a short video application, and the method further comprises: after a target image resource corresponding to a target image is generated according to the user setting, releasing the target image resource as a new short video. In this way, the new short video releasing mode can be provided, so that the video releasing function of the short video application is enriched, and other users can be prompted that the current user has updated the avatar or the background image in the novel mode. For example, the releasing the target image resource as a new short video may comprise: when a releasing-video instruction (such as checking a releasing-video option) inputted by the user is received, releasing the target image resource as the new short video.

In some embodiments, the target image in the target interface corresponds to a first user, and the method may further comprise: receiving, on the target interface, a fifth preset operation for the target image that is inputted by the second user, to enter a setting interface corresponding to the target image. In this way, the user can be allowed to quickly enter the setting interface corresponding to the target image in a guest state. The fifth preset operation is not specifically limited, for example, long-pressing a target image; or clicking a target image, to present an enlargement of the target image and display an image setting button, and clicking the image setting button. In the setting interface, the video data may be imported, and the video data may also be acquired in a mode of shooting, which is not specifically limited. If the video data is acquired in the mode of shooting, the setting interface at this time may also be the shooting preview interface described above.

In some embodiments, the method may further comprise: after it is determined that the setting of the target image is completed, displaying a setting completion notification, to display a target interface after the setting completion notification is triggered. After the setting of the target image is completed, the target interface can, by triggering the notification, be quickly entered for the user viewing the actual setting effect, wherein the setting completion notification can be sent to the user in a form of an internal message. For example, if a setting interface corresponding to a target image is entered from a guest state (for example, a second user is viewing related information of a first user, and for the second user at this time, it can be understood as the guest state), a target interface corresponding to a current user (for example, a second user) is displayed. For example, assumed that a second user is viewing a personal profile of a first user and finds that dynamical play of an avatar of the first user can be performed, the second user may, by an inputted fourth preset operation for the avatar, enter a setting interface corresponding to the avatar, and after the setting of the avatar on the setting interface is completed, an avatar setting completion notification is displayed, and after the second user triggers the avatar setting completion notification, a personal profile of the second user is displayed, so that the second user may quickly view the display effect of the newly set avatar in his own personal profile.

In some embodiments, the target image in the target interface corresponds to the first user, and a target image resource corresponding to the target image is obtained by processing video data corresponding to the first user in a preset processing mode; and the method further comprises: in response to a fourth preset operation for the target image that is received on the target interface and is inputted by the second user, entering a setting interface corresponding to the target image; and receiving video data corresponding to the second user through the setting interface, and processing the video data corresponding to the second user by using the preset processing mode, to obtain an image resource of a target image corresponding to the second user. After a current user sees a target image such as an avatar or a background image of another user, if he wants to set a same-style target image, he can, by means of the above solution, quickly obtain a same-style avatar or background image, so that interest is enhanced, and convenience of the user operation is improved. The fourth preset operation is not specifically limited, for example, long-pressing a target image; or clicking a target image, to present an enlargement of the target image and display an image setting button, and clicking an image setting button. The first processing mode may, for example, include the processing mode of obtaining the target image including the virtual character described above, or include the shooting prompt box described above, or include some props involved in the process of setting the avatar or the background image.

Figure 5:
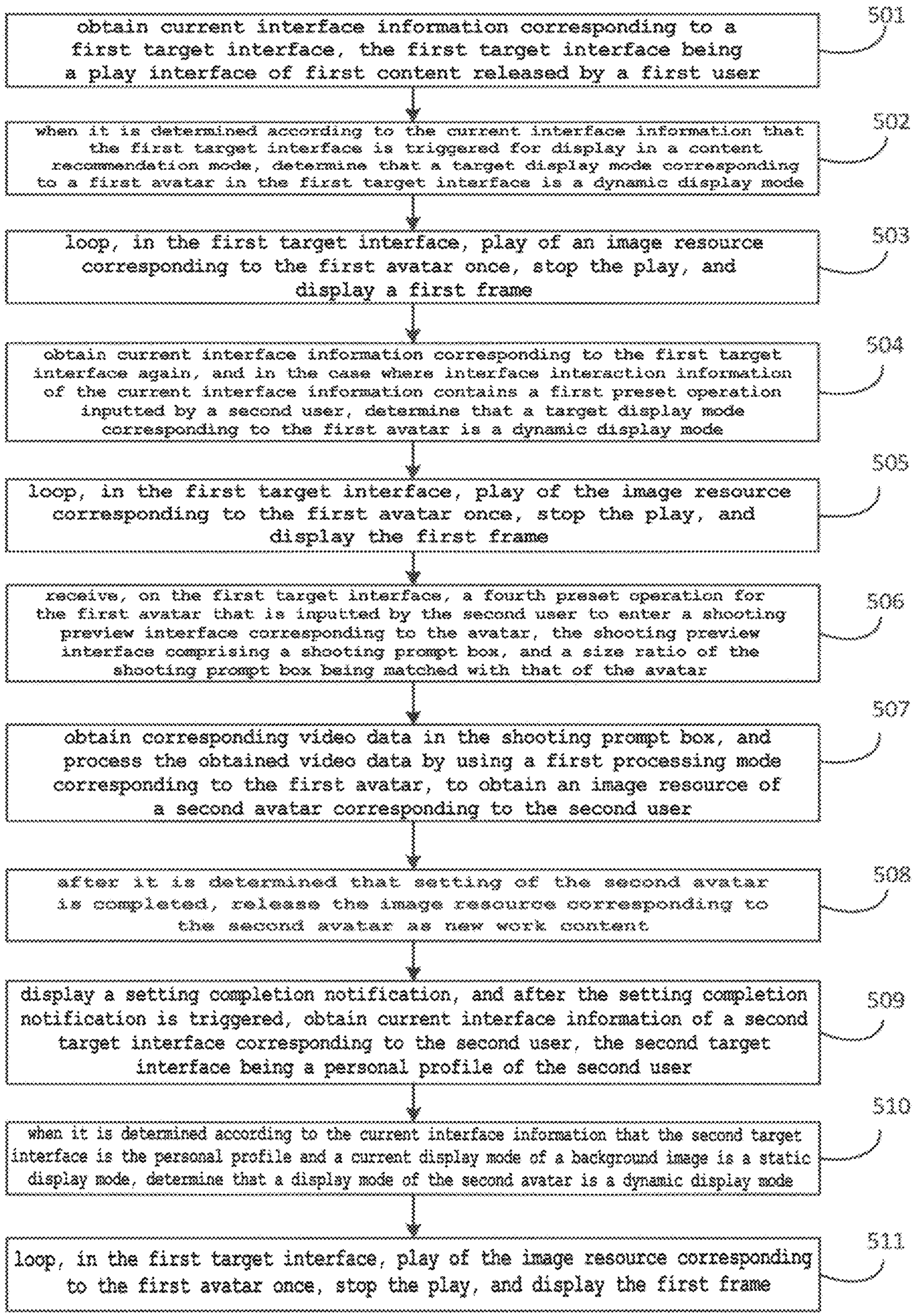
FIG. 5 is a schematic flow diagram of another image display method provided by an embodiment of the present disclosure.

FIG. 5 is a schematic flow diagram of another image display method provided by an embodiment of the present disclosure, where the embodiment of the present disclosure is refined based on various example solutions in the foregoing embodiments, and illustrated by taking a short video application as an example, for example, the method comprises the following steps:

step 501, obtaining current interface information corresponding to a first target interface, the first target interface being a play interface of first content released by a first user.

Exemplarily, taking a short video application as an example, the first content may be a short video released by the first user. In this step, the current interface information corresponding to the first target interface may be obtained before the first target interface is to be displayed soon, or may be obtained when the first target interface is in a display state, the specific obtaining time being not limited. It should be noted that, each time the current interface information is obtained, the information that needs to be obtained may be different.

Step 502, when it is determined according to the current interface information that the first target interface is triggered for display in a content recommendation mode, determining that a target display mode corresponding to a first avatar in the first target interface is a dynamic display mode.

For example, when it is determined according to current interface information that a first target interface is triggered for display from a content play list in a personal profile according to a selection operation of a user, it is determined that a target display mode corresponding to a first avatar in the first target interface is a static display mode. Generally, the personal profile also includes an avatar, if the personal profile has been displayed before, it is indicated that the user has viewed the avatar subjected to dynamic play, and at this time, the avatar can be subjected to static display in the first target interface.

Step 503, looping, in the first target interface, play of an image resource corresponding to the first avatar once, stopping the play, and displaying a first frame.

Step 504, obtaining current interface information corresponding to the first target interface again, and in the case where interface interaction information of the current interface information contains a first preset operation inputted by a second user, determining that a target display mode corresponding to the first avatar is a dynamic display mode.

The second user may be understood as a user who is currently viewing the first target interface. The first preset operation is an interaction operation for the first content, such as triggering a like control or inputting comment information.

Step 505, looping, in the first target interface, play of the image resource corresponding to the first avatar once, stopping the play, and displaying the first frame.

Step 506, receiving, on the first target interface, a fourth preset operation for the first avatar that is inputted by the second user, to enter a shooting preview interface corresponding to the avatar, the shooting preview interface comprising a shooting prompt box, and a size ratio of the shooting prompt box being matched with that of the avatar.

Step 507, obtaining corresponding video data in the shooting prompt box, and processing the obtained video data by using a first processing mode corresponding to the first avatar, to obtain an image resource of a second avatar corresponding to the second user.

A character in the first avatar may be a virtual character corresponding to the first user, such as a cartoon character or a 3D human figure, and the first processing mode may be, for example, the processing mode based on the preset style migration model described above, which is not described in detail herein. The first processing mode may also be to process, by using a prop for shooting a short video that is provided by the short video application, the video data containing a facial image of the user to obtain a corresponding avatar resource, wherein the prop may include, for example, a cartoon prop.

Step 508, after it is determined that setting of the second avatar is completed, releasing the image resource corresponding to the second avatar as new work content.

For example, it is determined whether an instruction of synchronous release as a work that is inputted by a user is received, and if the instruction is received, an image resource corresponding to a second avatar is released as new work content.

Step 509, displaying a setting completion notification, and after the setting completion notification is triggered, obtaining current interface information of a second target interface corresponding to the second user, the second target interface being a personal profile of the second user.

Step 510, when it is determined according to the current interface information that the second target interface is the personal profile and a current display mode of a background image is a static display mode, determining that a display mode of the second avatar is a dynamic display mode.

Step 511, looping, in the first target interface, play of the image resource corresponding to the first avatar once, stopping the play, and displaying the first frame.

It can be understood that, in other embodiments, the steps 502-505 may also be a display mode of a background image in the first target interface, and the steps 506-511 may also be operations of the user for the background image in the first target interface.

According to the image display method provided by the embodiment of the present disclosure, when a content play interface containing an avatar needs to be displayed in a content recommendation mode, a dynamic avatar is subjected to dynamic play once and a first frame of the avatar is subjected to static display, and after an interaction operation is inputted by a user, the dynamic avatar is subjected to the dynamic play once again to respond to the interaction operation; and when the user needs to set a same-style avatar, he can input an operation for the desired same-style avatar and then enter a shooting preview interface of the avatar, rapidly and accurately record video data containing a facial image under a prompt of a shooting prompt box in the shooting preview interface, and automatically generate the same-style avatar; and after completing the setting of the avatar, he can synchronously release the avatar as a short video, and in a mode of triggering a notification, rapidly jump to a user personal profile for viewing dynamic display effect of the avatar. By using the above technical solution, while the display effect and the visual effect of the avatar are enriched, a new avatar-based interaction mode is added, and the setting of the same-style avatar is supported, which improves the convenience of the setting of the dynamic avatar, and enhances interest of the application from a plurality of dimensions, and therefore effectively promotes the user experience.

Figure 6:
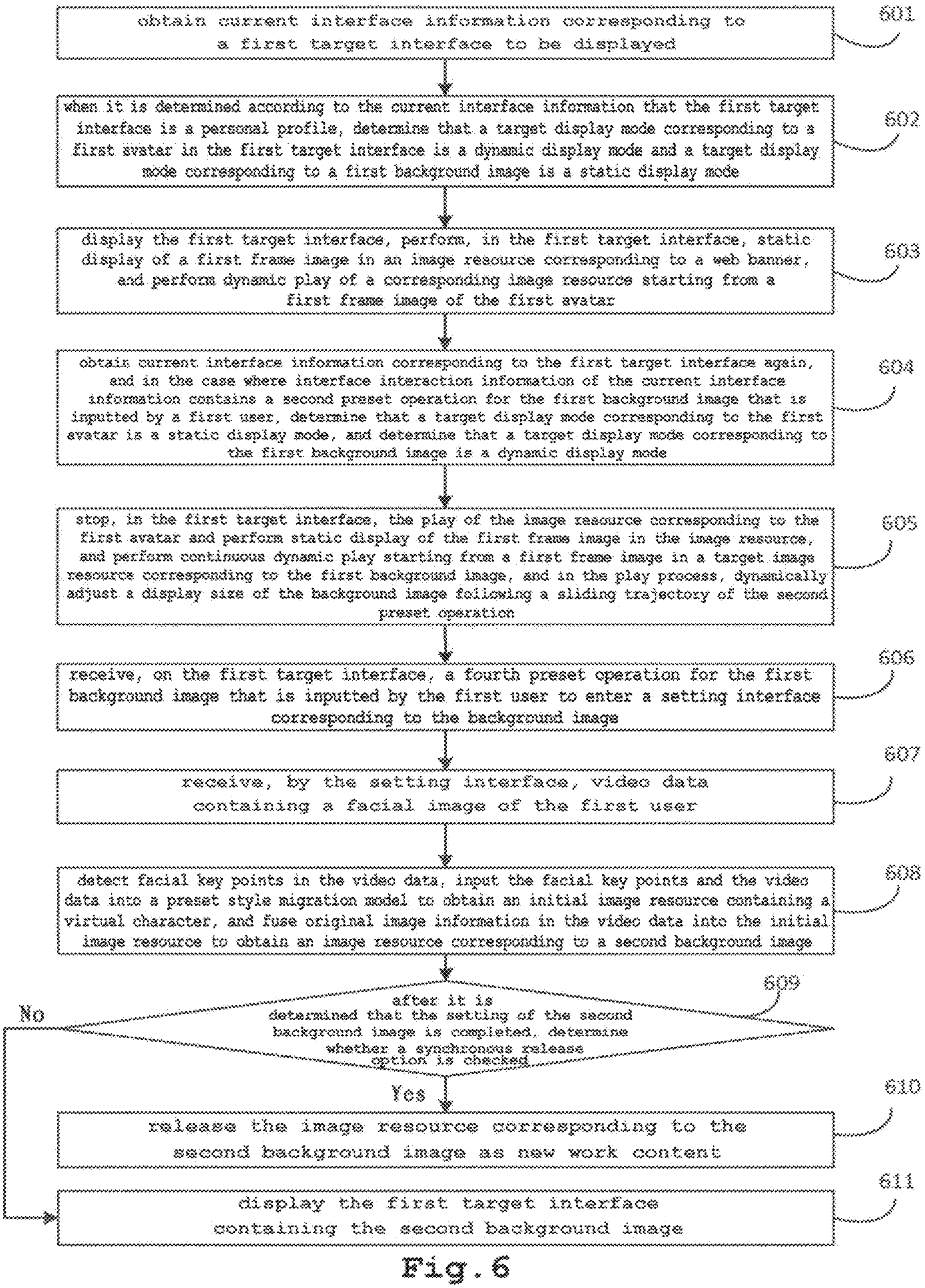
FIG. 6 is a schematic flow diagram of still another image display method provided by an embodiment of the present disclosure.

FIG. 6 is a schematic flow diagram of another image display method provided by an embodiment of the present disclosure, where the embodiment of the present disclosure is refined based on various example solutions in the foregoing embodiments, and illustrated by taking a short video application as an example, for example, the method comprises the following steps:

step 601, obtaining current interface information corresponding to a first target interface to be displayed.

It is assumed that the first target interface is a personal profile of a first user. Exemplarily, taking a short video application as an example, the personal profile may include an avatar and a background image simultaneously, wherein the background image may be a web banner. In this step, when the first target interface is to be displayed soon (for example, it is detected that a user triggers a display entry of the first target interface), the current interface information corresponding to the first target interface may be obtained.

Step 602, when it is determined according to the current interface information that the first target interface is a personal profile, determining that a target display mode corresponding to a first avatar in the first target interface is a dynamic display mode and a target display mode corresponding to a first background image is a static display mode.

Exemplarily, when the personal profile is entered, the avatar may be subjected to dynamic play by default, and in order to avoid interference between the avatar and the background image, the background image may be subjected to static display by default.

Step 603, displaying the first target interface, performing, in the first target interface, static display of a first frame image in an image resource corresponding to a web banner, and performing dynamic play of a corresponding image resource starting from a first frame image of the first avatar.

Step 604, obtaining current interface information corresponding to the first target interface again, and in the case where interface interaction information of the current interface information contains a second preset operation for the first background image that is inputted by a first user, determining that a target display mode corresponding to the first avatar is a static display mode, and determining that a target display mode corresponding to the first background image is a dynamic display mode.

It should be noted that, each time the current interface information is obtained, the information that needs to be obtained may be different, for example, in step 601, if the first target interface is not in a display state, an interface type may be obtained, and if the first target interface has been already in the display state, the interface type has been already determined and does not need to be obtained again, and at this time, other information, such as interface interaction information, may be obtained. The second preset operation may be understood as an operation of triggering dynamic play of the background image, for example, an operation of pressing a first background image and dragging downwards.

For example, if a background image whose image resource is a file having dynamically changed image content is presented to a user for the first time, and a current display mode of the background image is a static display mode, an operation prompt matched with a second preset operation may be displayed, for example, a background image or a title bar reciprocating in a sliding direction corresponding to a second preset operation to form a prompt effect of vibration, so that the user is quickly familiar with the operation mode of triggering dynamic play of the background image.

Step 605, stopping, in the first target interface, the play of the image resource corresponding to the first avatar and performing static display of the first frame image in the image resource, and performing continuous dynamic play starting from a first frame image in a target image resource corresponding to the first background image, and in the play process, dynamically adjusting a display size of the background image following a sliding trajectory of the second preset operation.

Exemplarily, taking a web banner as an example, the operation may be to press a screen and slid downwards, for example, the operation may be implemented by pulling down a title bar, in the sliding process, the web banner is subjected to dynamic play, and a display size of the web banner gradually increases with a sliding trajectory in a height direction, and when a user releases his hand or slides backwards, the dynamic play of the web banner is continued, and the display size of the web banner gradually decreases with the sliding trajectory in the height direction, and finally restores to a display state before the second preset operation is received.

Step 606, receiving, on the first target interface, a fourth preset operation for the first background image that is inputted by the first user to enter a setting interface corresponding to the background image.

For example, the fourth preset operation may be to click a background image to enter a background image preview interface and trigger a shooting button in the background image preview interface to enter a setting interface corresponding to the background image, wherein the setting interface may be a preview interface of a short video camera in an application.

Step 607, receiving, through the setting interface, video data containing a facial image of the first user.

Step 608, detecting facial key points in the video data, inputting the facial key points and the video data into a preset style migration model to obtain an initial image resource containing a virtual character, and fusing original image information in the video data into the initial image resource to obtain an image resource corresponding to a second background image.

Step 609, after it is determined that the setting of the second background image is completed, determining whether a synchronous release option is checked, and based on the determination result that the synchronous release option is checked, executing step 610; and based on the determination result that the synchronous release option is not checked, executing step 611.

For example, after the setting of the second background image is completed, it is determined whether an instruction of synchronous release as a work that is inputted by the user is received, and based on the determination result of the instruction being received, the process jumps to step 610.

Step 610, releasing the image resource corresponding to the second background image as new work content.

Step 611, displaying the first target interface containing the second background image.

It can be understood that, in other embodiments, the steps 606-611 may also be setting operations of the user for the avatar.

According to the image display method provided by the embodiment of the present disclosure, in the personal profile containing both the avatar and the background image, the dynamic display mode is mutually exclusively set, that is, the avatar and the background image are not in the dynamic display mode simultaneously, so that mutual interference between the two is avoided, and the display size of the background image is dynamically adjusted according to the operation trajectory while the background image is subjected to dynamic play, which can further improve the interest and clearly and conveniently view the dynamic background image. In addition, the updating setting of the background image is supported, after the setting is completed, the new background image can be released as a work, so that the video release function of the application is enriched, and other users can be, in this novel mode, prompted that the avatar or the background image is updated by the current user, so that the application function is further enriched, and the user experience is improved.

Figure 7:
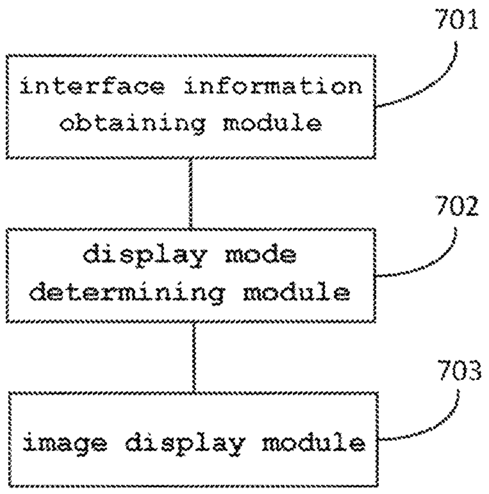
FIG. 7 is a structural block diagram of an image display apparatus provided by an embodiment of the present disclosure.

FIG. 7 is a structural block diagram of an image display apparatus provided by an embodiment of the present disclosure, where the apparatus may be implemented by software and/or hardware, and may be generally integrated in an electronic device, and may perform image display by executing the image display method. As shown in FIG. 7, the apparatus comprises:

an interface information obtaining module 701 configured to obtain current interface information corresponding to a target interface, the target interface comprising a target image, and the current interface information comprising at least one of interface attribute information, interface interaction information and interface display state information;

a display mode determining module 702 configured to determine, according to the current interface information, a target display mode corresponding to the target image, the target display mode being a dynamic display mode or a static display mode; and an image display module 703 configured to display, in the target display mode, a target image resource corresponding to the target image on the target interface, the target image resource being a file having dynamically changed image content.

According to the image display apparatus provided in the embodiment of the present disclosure, current interface information corresponding to a target interface is obtained, a target display mode corresponding to the target image comprised in the target interface is determined according to the current interface information, a corresponding target image resource comprising a file having dynamically changed image content, and the target display mode being a dynamic display mode or a static display mode, and finally a target image resource corresponding to the corresponding target image is, according to the target display mode, displayed on the target interface. By using the above technical solution, the image resource of the target image in the interface can be set as the file having dynamically changed image content, and when the target image needs to be displayed in the interface, the display mode corresponding to the image resource is selected according to the actual interface information, so that the target image can be displayed in different modes under different conditions, which enriches the mode of feedback of the interaction operation of the user, and improves the interaction experience.

For example, the image display module is configured to: when the target display mode is a dynamic display mode, perform, on the target interface, continuous and dynamic play of image frames in a target image resource corresponding to the corresponding target image; or after the times of play of a target image resource corresponding to the corresponding target image in the target interface reach a preset number of loops, stop the play and display a single-frame image with a first preset frame number in the target image resource, one loop comprising continuous and dynamic play from a first frame in the target image resource to a last frame.

For example, the image display module is configured to: when the target display mode is a static display mode, perform, on the target interface, static display of a single-frame image with a second preset frame number in a target image resource corresponding to the corresponding target image.

For example, the current interface information comprises an interface type. The display mode determining module is configured to: determine, according to an interface type corresponding to the target interface, that a target display mode corresponding to the target image is a dynamic mode; or determine, according to an interface type corresponding to the target interface, that a target display mode corresponding to the target image is a static mode; or determine, according to an interface type corresponding to the target interface and preset information in the current interface information, that a target display mode corresponding to the target image is a dynamic mode or a static mode.

For example, the current interface information comprises the interface interaction information. The display mode determining module is configured to: in the case where the interface interaction information comprises a first preset operation, the target display mode corresponding to the target image being a dynamic display mode, the first preset operation comprising an interaction operation for first content in the target interface.

For example, the image display module is configured to: after the continuous and dynamic play from the first frame in the target image resource corresponding to the target image to the last frame in the target interface, stop the play and display a single-frame image with a third preset frame number in the target image resource.

For example, the current interface information comprises the interface interaction information. The display mode determining module is configured to: in the case where the interface interaction information comprises a second preset operation for the target image that is inputted by a user, the target display mode corresponding to the target image being a dynamic display mode, the second preset operation comprising a sliding operation, a clicking operation or a long-pressing operation.

For example, the image display module is configured to: perform dynamic play of image frames in a target image resource corresponding to a background image in the target interface, and dynamically adjust a display size of the background image following a sliding trajectory of the second preset operation in the play process.

For example, the image display module is configured to: perform continuous and dynamic play starting from an image frame with the fourth preset frame number in the target image resource corresponding to the background image in the target interface, and dynamically adjust the display size of the background image following the sliding trajectory of the second preset operation in the play process.

For example, the interface display state information comprises a current display mode of the target image. The interface information obtaining module is configured to: the target image in the target interface comprising both a first target image and a second target image, in the case where a current display mode of the first target image is a dynamic display mode and a current display mode of the second target image is a static display mode, detect a third preset operation for the second target image, then determine that a target display mode corresponding to the first target image is a static display mode and a target display mode corresponding to the second target image is a dynamic display mode.

For example, a character in the target image comprises a virtual character obtained after an image of a target object is processed.

For example, a target image resource of a target image comprising the virtual character is obtained by: in response to an operation that the user triggers a shooting function, obtaining video data comprising a facial image of a target object; detecting facial key points of the target object in the video data; inputting the facial key points and the video data into a preset style migration model to obtain an initial image resource comprising the virtual character; and fusing original image information in the video data into the initial image resource to obtain the target image resource.

For example, the original image information comprises at least one of low-frequency information and illumination information.

For example, the apparatus further comprises: a shooting preview interface display module configured to display a shooting preview interface in an application to which the target interface belongs, the shooting preview interface comprising a shooting prompt box, and a size ratio of the shooting prompt box being matched with that of the target image; and a resource generation module configured to generate a target image resource of the corresponding target image according to corresponding video data in the shooting prompt box.

For example, the application to which the target interface belongs comprises a short video application, and the apparatus further comprises: a video releasing module configured to, after the target image resource corresponding to the target image is generated according to the setting of the user, release the target image resource as a new short video.

For example, the target image in the target interface corresponds to a first user, and a target image resource corresponding to the target image is obtained by processing video data corresponding to the first user by using a preset processing mode. The apparatus further comprises: a setting interface entering module configured to, in response to a fourth preset operation for the target image that is received on the target interface and is inputted by a second user, enter a setting interface corresponding to the target image; and a video data processing module configured to receive, by the setting interface, video data corresponding to the second user, and process the video data corresponding to the second user by using the preset processing mode to obtain an image resource of a target image corresponding to the second user.

For example, a file format of the target image resource comprises a dynamic picture format or a video format.

Figure 8:
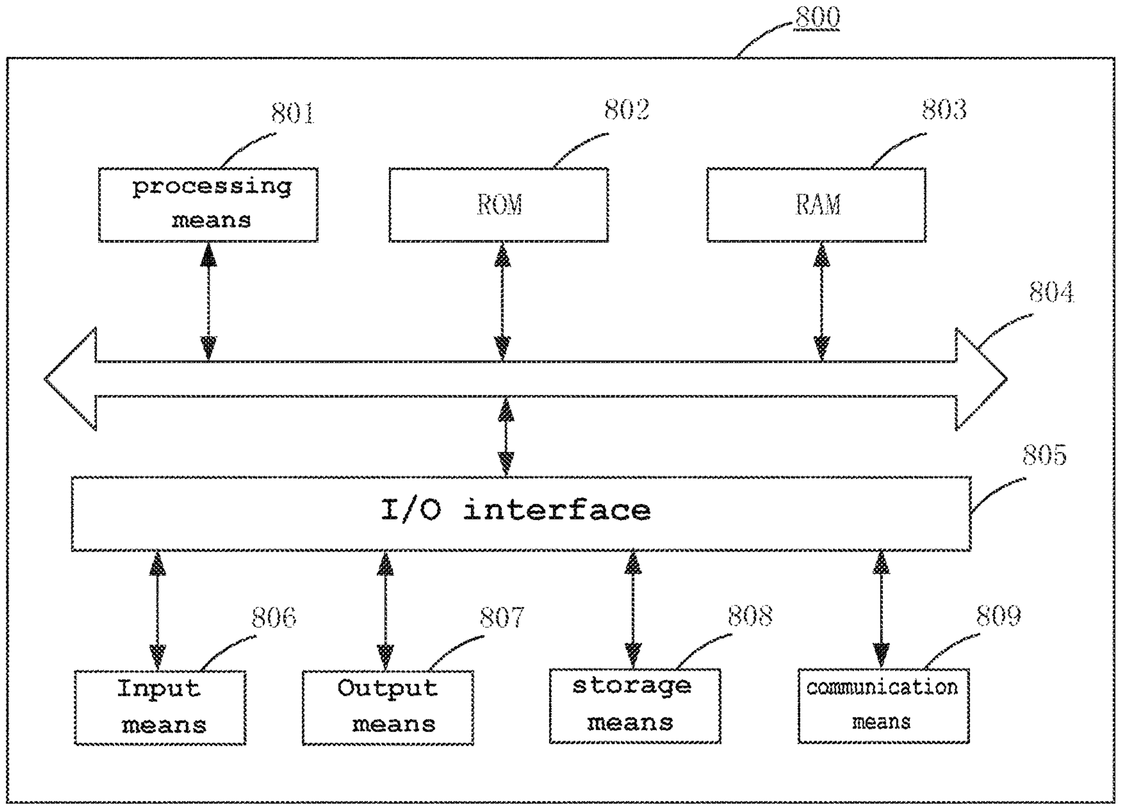
FIG. 8 is a structural block diagram of an electronic device provided by an embodiment of the present disclosure.

Referring to FIG. 8 below, a schematic structural diagram of an electronic device 800 suitable for implementing the embodiments of the present disclosure is shown therein. The electronic device in the embodiments of the present disclosure may include, but is not limited to, a mobile terminal such as a mobile phone, a notebook computer, a digital broadcast receiver, a PDA (personal digital assistant), a PAD (tablet computer), a PMP (portable multimedia player), and a vehicle-mounted terminal (e.g., a vehicle-mounted navigation terminal), and a fixed terminal such as a digital TV and a desktop computer. The electronic device shown in FIG. 8 is only an example, and should not bring any limitation to the functions and the scope of use of the embodiments of the present disclosure.

As shown in FIG. 8, the electronic device 800 may include a processing means (e.g., central processing unit, graphical processing unit, etc.) 801 that may perform various appropriate actions and processes according to a program stored in a read-only memory (ROM) 802 or a program loaded from a storage means 808 into a random access memory (RAM) 803. In the RAM 803, various programs and data required for the operation of the electronic apparatus 800 are also stored. The processing means 801, the ROM 802, and the RAM 803 are connected to each other by a bus 804. An input/output (I/O) interface 805 is also connected to the bus 804.

Generally, the following means may be connected to the I/O interface 805: an input means 806 including, for example, a touch screen, touch pad, keyboard, mouse, camera, microphone, accelerometer, gyroscope, or the like; an output means 807 including, for example, a liquid crystal display (LCD), speaker, vibrator, or the like; a storage means 808 including, for example, a magnetic tape, hard disk, or the like; and a communication means 809. The communication means 809 may allow the electronic device 800 to communicate wirelessly or by wire with other devices to exchange data. While FIG. 8 illustrates the electronic device 800 having various means, it is should be understood that not all illustrated means are required to be implemented or provided. More or fewer means may be alternatively implemented or provided.

For example, according to embodiments of the present disclosure, the process described above with reference to the flow diagrams may be implemented as a computer software program. For example, the embodiments of the present disclosure include a computer program product, the computer program product comprising a computer program carried on a non-transitory computer-readable medium, the computer program containing program code for performing the method illustrated by the flow diagrams. In such an embodiment, the computer program may be downloaded from a network via the communication means 809 and installed, or installed from the storage means 808, or installed from the ROM 802. The computer program, when executed by the processing means 801, performs the above functions defined in the methods of the embodiments of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

The above computer-readable medium may be contained in the above electronic device; or may be exist separately without being assembled into the electronic device.

The above computer-readable medium has one or more programs carried thereon, wherein the above one or more programs, when executed by the electronic device, cause the electronic device to: obtain current interface information corresponding to a target interface, the target interface comprising a target image, and the current interface information comprising at least one of interface attribute information, interface interaction information and interface display state information; determine, according to the current interface information, a target display mode corresponding to the target image, the target display mode being a dynamic display mode or a static display mode; and display, in the target display mode, a target image resource corresponding to the target image on the target interface, the target image resource being a file having dynamically changed image content.

Computer program code for performing the operation of the present disclosure may be written in one or more programming languages or a combination thereof, wherein the above programming language includes but is not limited to an object-oriented programming language such as Java, Smalltalk, and C++, and also includes a conventional procedural programming language, such as the "C" programming language or a similar programming language. The program code may be executed entirely on a user's computer, partly on the user's computer, as a stand-alone software package, partly on the user's computer and partly on a remote computer, or entirely on the remote computer or server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or portion of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or the blocks may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or a combination of special-purpose hardware and computer instructions.

The involved module described in the embodiments of the present disclosure may be implemented by software or hardware. The name of the module does not, in some cases, constitute a limitation on the module itself, for example, an image display module may also be described as a "module that displays, in the target display mode, a target image resource corresponding to the corresponding target image on the target interface".

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided an image display method comprising:

obtaining current interface information corresponding to a target interface, the target interface comprising a target image, and the current interface information comprising at least one of interface attribute information, interface interaction information and interface display state information;

determining, according to the current interface information, a target display mode corresponding to the target image, the target display mode being a dynamic display mode or a static display mode; and displaying, in the target display mode, a target image resource corresponding to the target image on the target interface, the target image resource being a file having dynamically changed image content.

For example, when the target display mode is a dynamic display mode, the displaying, in the target display mode, a target image resource corresponding to the target image on the target interface comprises:

performing, on the target interface, continuous and dynamic play of image frames in a target image resource corresponding to the corresponding target image; or after the times of play of a target image resource corresponding to the corresponding target image in the target interface reach a preset number of loops, stopping the play and displaying a single-frame image with a first preset frame number in the target image resource, one loop comprising continuous and dynamic play from a first frame in the target image resource to a last frame.

For example, when the target display mode is a static display mode, the displaying, in the target display mode, a target image resource corresponding to the target image on the target interface comprises:

performing, on the target interface, static display on a single-frame image with a second preset frame number in a target image resource corresponding to the corresponding target image.

For example, the interface attribute information comprises an interface type; and the determining, according to the current interface information, a target display mode corresponding to the target image comprises:

determining, according to an interface type corresponding to the target interface, that the target display mode corresponding to the target image is a dynamic mode; or determining, according to an interface type corresponding to the target interface, that the target display mode corresponding to the target image is a static mode; or determining, according to an interface type corresponding to the target interface and preset information in the current interface information, that the target display mode corresponding to the target image is a dynamic mode or a static mode.

For example, the current interface information comprises the interface interaction information; and the determining, according to the current interface information, a target display mode corresponding to the target image comprises: in the case where the interface interaction information comprises a first preset operation, the target display mode corresponding to the target image being a dynamic display mode, the first preset operation comprising an interaction operation for first content in the target interface.

For example, the current interface information comprises the interface interaction information; and the determining, according to the current interface information, a target display mode corresponding to the target image comprises: in the case where the interface interaction information comprises a second preset operation for the target image that is inputted by a user, the target display mode corresponding to the target image being a dynamic display mode, the second preset operation comprising a sliding operation, a clicking operation or a long-pressing operation.

For example, the target image comprises a background image; and the second preset operation comprises the sliding operation, and the displaying, in the target display mode, a target image resource corresponding to the target image on the target display interface, comprises:

performing, in the target interface, dynamic play of image frames in a target image resource corresponding to the background image, and dynamically adjusting a display size of the background image following a sliding trajectory of the second preset operation in the play process.

For example, the interface display state information comprises a current display mode of the target image, the target image in the target interface comprising both a first target image and a second target image, and the determining, according to the current interface information, a target display mode corresponding to the target image comprising:

in the case where a current display mode of the first target image is a dynamic display mode and a current display mode of the second target image is a static display mode, detecting a third preset operation for the second target image, then determining that a target display mode corresponding to the first target image is a static display mode and a target display mode corresponding to the second target image is a dynamic display mode.

For example, a character in the target image comprises a virtual character obtained after an image of a target object is processed.

For example, a target image resource of the target image comprising the virtual character is obtained by:

in response to an operation that the user triggers a shooting function, obtaining video data comprising a facial image of the target object;

detecting facial key points of the target object in the video data;

inputting the facial key points and the video data into a preset style migration model to obtain an initial image resource comprising the virtual character; and fusing original image information in the video data into the initial image resource to obtain the target image resource.

For example, the original image information comprises at least one of low-frequency information and illumination information.

For example, the method further comprises:

displaying a shooting preview interface in an application to which the target interface belongs, the shooting preview interface comprising a shooting prompt box, and a size ratio of the shooting prompt box being matched with that of the target image; and generating, according to corresponding video data in the shooting prompt box, a target image resource of the corresponding target image.

For example, a target image in the target interface corresponds to a first user, and a target image resource corresponding to the target image is obtained by processing video data corresponding to the first user by using a preset processing mode; and the method further comprises:

in response to a fourth preset operation for the target image that is received on the target interface and is inputted by a second user, entering a setting interface corresponding to the target image; and receiving, through the setting interface, video data corresponding to the second user, and processing the video data corresponding to the second user by using the preset processing mode to obtain an image resource of a target image corresponding to the second user.

For example, a file format of the target image resource comprises a dynamic picture format or a video format.

According to one or more embodiments of the present disclosure, there is provided an image display apparatus, comprising:

an interface information obtaining module configured to obtain current interface information corresponding to a target interface, the target interface comprising a target image, and the current interface information comprising at least one of interface attribute information, interface interaction information and interface display state information;

a display mode determining module configured to determine, according to the current interface information, a target display mode corresponding to the target image, the target display mode being a dynamic display mode or a static display mode; and an image display module configured to display, in the target display mode, a target image resource corresponding to the target image on the target interface, the target image resource being a file having dynamically changed image content.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

What is claimed is:

1. An image display method, comprising:

obtaining interface information corresponding to an interface, the interface comprising an image, and the interface information comprising at least one of interface attribute information, or interface display state information;

determining, according to the interface information, a display mode for the image, the display mode being at least one of a dynamic display mode or a static display mode; and displaying, in the display mode, an image resource corresponding to the image on the interface, the image resource including dynamically changed image content, wherein in response to determining that the display mode is a static display mode, the displaying, in the display mode, the image resource corresponding to the image on the interface comprises:

performing, on the interface, static display of a single-frame image included in the image resource corresponding to the image, wherein the method further comprises: displaying a shooting preview interface in an application to which the interface belongs, the shooting preview interface comprising a shooting prompt box, and a size ratio of the shooting prompt box being matched with that of the image; and generating, according to corresponding video data in the shooting prompt box, an image resource of the image.

2. The method according to claim 1, wherein in response to determining that the display mode is a dynamic display mode, the displaying, in the display mode, the image resource corresponding to the image on the interface comprises at least one of:

playing, on the interface, an image frame in the image continuously and dynamically; or in response to times of playing of the image resource on the interface reaching a preset number, stopping the playing and displaying a single-frame image with a first preset frame number in the image resource, one time of the playing comprising a playing from a first frame in the image resource to a last frame in the image resource.

3. The method according to claim 1, wherein the single-frame image is a single-frame with a second preset frame number in the image resource corresponding to the image on the interface.

4. The method according to claim 1, wherein the interface attribute information comprises an interface type; and the determining, according to the interface information, the display mode for the image comprises at least one of:

determining, according to an interface type corresponding to the interface, that the display mode corresponding to the image is a dynamic mode; or determining, according to the interface type corresponding to the interface, that the display mode corresponding to the image is a static mode; or determining, according to the interface type corresponding to the interface and preset information in the interface information, that the display mode corresponding to the image is at least one of a dynamic mode or a static mode.

5. The method according to claim 1, wherein the interface information comprises interface interaction information; and the determining, according to the interface information, the display mode for the image comprises:

in response to determining that the interface interaction information comprises a first preset operation, the display mode corresponding to the image being a dynamic display mode, the first preset operation comprising an interaction operation for first content on the interface.

6. The method according to claim 1, wherein the interface information comprises interface interaction information; and the determining, according to the interface information, the display mode for the image comprises:

in response to determining that the interface interaction information comprises a second preset operation for the image that is inputted by a user, the display mode corresponding to the image being a dynamic display mode, and the second preset operation comprising at least one of a sliding, a clicking or a long-pressing.

7. The method according to claim 6, wherein the image comprises a background image; and the second preset operation comprises the sliding, and wherein the displaying, in the display mode, the image resource corresponding to the image on the interface comprising:

performing, on the interface, dynamic playing of image frames in an image resource corresponding to the background image, and dynamically adjusting a display size of the background image following a sliding trajectory of the second preset operation in the dynamic playing.

8. The method according to claim 1, wherein the interface display state information comprises a current display mode of the image, the image on the interface comprising both a first image and a second image, and the determining, according to the interface information, a display mode for the image comprising:

in response to determining that a current display mode for the first image is a dynamic display mode and a current display mode for the second image is a static display mode, and detecting a third preset operation for the second image, determining that a display mode for the first image is a static display mode and a display mode for the second image is a dynamic display mode.

9. The method according to claim 1, wherein a character in the image comprises a virtual character obtained after an image of an object is processed.

10. The method according to claim 9, wherein the image resource of the image comprising the virtual character is obtained by:

in response to an operation that a user triggers a shooting function, obtaining video data comprising a facial image of the object;

detecting facial key points of the object in the video data;

inputting the facial key points and the video data into a preset style migration model to obtain an initial image resource comprising the virtual character; and fusing original image information in the video data into the initial image resource to obtain the image resource.

11. The method according to claim 10, wherein the original image information comprises at least one of low-frequency information or illumination information.

12. The method according to claim 9, wherein the image on the interface corresponds to a first user, and the image resource corresponding to the image is obtained by processing video data corresponding to the first user by using a preset processing mode; and the method further comprises:

in response to a fourth preset operation for an image that is received on the interface and is inputted by a second user, entering a setting interface corresponding to the image; and receiving, through the setting interface, video data corresponding to the second user, and processing the video data corresponding to the second user by using the preset processing mode, to obtain an image resource of the image corresponding to the second user.

13. The method according to claim 1, wherein the image resource including a file having dynamically changed image content, and a file format of the image resource comprises at least one of a dynamic picture format or a video format.

14. An electronic device comprising a memory, a processor and a computer program stored on the memory and running on the processor, the processor implementing, when executing the computer program, an image display method, comprising:

obtaining interface information corresponding to an interface, the interface comprising an image, and the interface information comprising at least one of interface attribute information, or interface display state information;

determining, according to the interface information, a display mode for the image, the display mode being at least one of a dynamic display mode or a static display mode; and displaying, in the display mode, an image resource corresponding to the image on the interface, the image resource including dynamically changed image content, wherein in response to determining that the display mode is a static display mode, the displaying, in the display mode, the image resource corresponding to the image on the interface comprises:

performing, on the interface, static display of a single-frame image included in the image resource corresponding to the image, wherein the method further comprises: displaying a shooting preview interface in an application to which the interface belongs, the shooting preview interface comprising a shooting prompt box, and a size ratio of the shooting prompt box being matched with that of the image; and generating, according to corresponding video data in the shooting prompt box, an image resource of the image.

15. The electronic device according to claim 14, wherein in response to determining that the display mode is a dynamic display mode, the displaying, in the display mode, the image resource corresponding to the image on the interface comprises at least one of:

playing, on the interface, an image frame in the image continuously and dynamically; or in response to times of playing of the image resource on the interface reaching a preset number, stopping the playing and displaying a single-frame image with a first preset frame number in the image resource, one time of the playing comprising a playing from a first frame in the image resource to a last frame in the image resource.

16. The electronic device according to claim 14, wherein the single-frame image is a single-frame image with a second preset frame number in the image resource corresponding to the image.

17. A non-transitory computer-readable storage medium having thereon stored a computer program which, when executed by a processor, implements an image display method, comprising:

obtaining interface information corresponding to an interface, the interface comprising an image, and the interface information comprising at least one of interface attribute information, or interface display state information;

determining, according to the interface information, a display mode for the image, the display mode being at least one of a dynamic display mode or a static display mode; and displaying, in the display mode, an image resource corresponding to the image on the interface, the image resource including dynamically changed image content, wherein in response to determining that the display mode is a static display mode, the displaying, in the display mode, the image resource corresponding to the image on the interface comprises:

performing, on the interface, static display of a single-frame image included in the image resource corresponding to the image, wherein the method further comprises: displaying a shooting preview interface in an application to which the interface belongs, the shooting preview interface comprising a shooting prompt box, and a size ratio of the shooting prompt box being matched with that of the image; and generating, according to corresponding video data in the shooting prompt box, an image resource of the image.

18. The non-transitory computer-readable storage medium according to claim 17, wherein in response to determining that the display mode is a dynamic display mode, the displaying, in the display mode, the image resource corresponding to the image on the interface comprises at least one of:

playing, on the interface, an image frame in the image continuously and dynamically; or in response to times of playing of the image resource on the interface reaching a preset number, stopping the playing and displaying a single-frame image with a first preset frame number in the image resource, one time of the playing comprising a playing from a first frame in the image resource to a last frame in the image resource.

19. The non-transitory computer-readable storage medium according to claim 17, wherein the single-frame image is a single-frame image with a second preset frame number in the image resource corresponding to the image.

* * * * *